(12) United States Patent
Zheng et al.

(10) Patent No.: US 12,223,711 B2
(45) Date of Patent: Feb. 11, 2025

(54) SYSTEM AND METHOD FOR ENERGY PROJECT STATUS DETECTION

(71) Applicant: RS Energy Group Topco, Inc., Calgary (CA)

(72) Inventors: Jingwen Zheng, Calgary (CA); Fanchi Meng, Calgary (CA); Jiarao Huang, Calgary (CA); Curtis Hess, Calgary (CA)

(73) Assignee: RS Energy Group Topco, Inc., Calgary (CA)

( * ) Notice: Subject to any disclaimer, the term of this patent is extended or adjusted under 35 U.S.C. 154(b) by 817 days.

(21) Appl. No.: 17/332,165

(22) Filed: May 27, 2021

(65) Prior Publication Data

US 2021/0374404 A1    Dec. 2, 2021

Related U.S. Application Data

(60) Provisional application No. 63/031,677, filed on May 29, 2020.

(51) Int. Cl.
| | |
|---|---|
| *G06T 7/62* | (2017.01) |
| *G06V 20/10* | (2022.01) |
| *H04Q 9/00* | (2006.01) |

(52) U.S. Cl.
CPC ............... *G06V 20/176* (2022.01); *G06T 7/62* (2017.01); *H04Q 9/00* (2013.01); *G06F 2218/10* (2023.01); *G06T 2207/10032* (2013.01); *H04Q 2209/40* (2013.01); *H04Q 2209/84* (2013.01)

(58) Field of Classification Search
CPC .......... G06V 20/176; G06T 7/62; G06T 7/06; G06T 2207/10032; G06F 2218/10; H04Q 2209/40; H04Q 2209/84
See application file for complete search history.

(56) References Cited

U.S. PATENT DOCUMENTS

| | | |
|---|---|---|
| 10,460,170 B1 | 10/2019 | Adler |
| 2018/0137355 A1* | 5/2018 | Rostand ............... G06V 20/176 |
| 2019/0384975 A1* | 12/2019 | Rostand ................. G06V 10/82 |

OTHER PUBLICATIONS

Extended European Search Report from corresponding EP Appln. No. 21811769.5 dated May 24, 2024.
Examination Report from corresponding CA Appln. No. 3,173,607 dated Aug. 5, 2024.

* cited by examiner

*Primary Examiner* — Gandhi Thirugnanam
*Assistant Examiner* — Michael Adam Shariff
(74) *Attorney, Agent, or Firm* — DLA Piper LLP (US)

(57) ABSTRACT

A computing system receives an indication of an energy project. The computing system monitors satellite image data of the energy project. The computing system determines that a first activity has been initiated for the energy project based on a change in satellite image data. The computing system monitors telemetry data associated with a location corresponding to the energy project and the satellite image data of the energy project. The computing system converts the telemetry data associated with the location corresponding to the energy project to a telemetry activity index. The computing system converts the satellite image data associated with the energy project to a satellite activity index. The computing system determines that the first activity has ended for the energy project based on changes in at least one of the telemetry activity index and the pad activity index.

20 Claims, 7 Drawing Sheets

SYSTEM AND METHOD FOR ENERGY PROJECT STATUS DETECTION

FIELD OF DISCLOSURE

The present disclosure generally relates to a method and a system for detecting an energy project status.

BACKGROUND

When an operator pursues land for an energy project, the operator typically needs to apply or file an application to obtain permits for such operation. Once the permit is filed, various information about the energy project is released, including the location of the energy project. Generally, operators are required to publicly reveal various stages of the energy project. However, there is typically a delay in this information, which may range anywhere from two to six months. Accordingly, there is a need for detecting various stages of an energy project's development instead of relying on developers or operators to publicly disclose this information.

SUMMARY

In some embodiments, a computer-implemented method for monitoring an energy project is disclosed herein. A computing system receives an indication of an energy project. The indication includes location data associated with the energy project. The computing system monitors satellite image data of the energy project. The satellite image data of the energy project corresponds to the location data associated with the energy project. The computing system determines that a first activity has been initiated for the energy project based on a change in the satellite image data. Upon determining that the first activity has been initiated, the computing system monitors telemetry data associated with a location corresponding to the energy project. The computing system continues to monitor the satellite image data of the energy project simultaneous with the telemetry data. The computing system converts the telemetry data associated with the location corresponding to the energy project to a telemetry activity index. The computing system converts the satellite image data associated with the energy project to a satellite activity index. The computing system determines that the first activity has ended for the energy project based on changes in at least one of the telemetry activity index and the satellite activity index.

In some embodiments, a system is disclosed herein. The system includes a processor and a memory. The memory has programming instruction stored thereon, which, when executed by the processor, causes the system to perform one or more operations. The one or more operations include receiving an indication of an energy project. The indication includes location data associated with the energy project. The one or more operations further include monitoring satellite image data of the energy project. The satellite image data of the energy project corresponds to the location data associated with the energy project. The one or more operations further include determining that a first activity has been initiated for the energy project based on a change in the satellite image data. The one or more operations further include, upon determining that the first activity has been initiated, monitoring telemetry data associated with a location corresponding to the energy project. The one or more operations further include continuing to monitor the satellite image data of the energy project simultaneous with the telemetry data. The one or more operations further include converting the telemetry data associated with the location corresponding to the energy project to a telemetry activity index. The one or more operations further include converting the satellite image data associated with the energy project to a satellite activity index. The one or more operations further include determining that the first activity has ended for the energy project based on changes in at least one of the telemetry activity index and the satellite activity index.

In some embodiments, a non-transitory computer readable medium is disclosed herein. The non-transitory computer readable medium includes one or more instructions that, when executed by a computing system, causes the computing system to perform one or more operations. The one or more operations include receiving, at the computing system, an indication of an energy project. The indication includes location data associated with the energy project. The one or more operations further include monitoring, by the computing system, satellite image data of the energy project. The satellite image data of the energy project corresponds to the location data associated with the energy project. The one or more operations further include determining, by the computing system, that a first activity has been initiated the energy project based on a change in the satellite image data. The one or more operations further include, upon determining that the first activity has occurred, monitoring, by the computing system, telemetry data associated with a location corresponding to the energy project. The one or more operations further include continuing, by the computing system, to monitor the satellite image data of the energy project simultaneous with the telemetry data. The one or more operations further include converting, by the computing system, the telemetry data associated with the location corresponding to the energy project to a telemetry activity index. The one or more operations further include converting, by the computing system, the satellite image data associated with the energy project to a satellite activity index. The one or more operations further include determining, by the computing system, that the first activity has ended for the energy project based on changes in at least one of the telemetry activity index and the satellite activity index.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
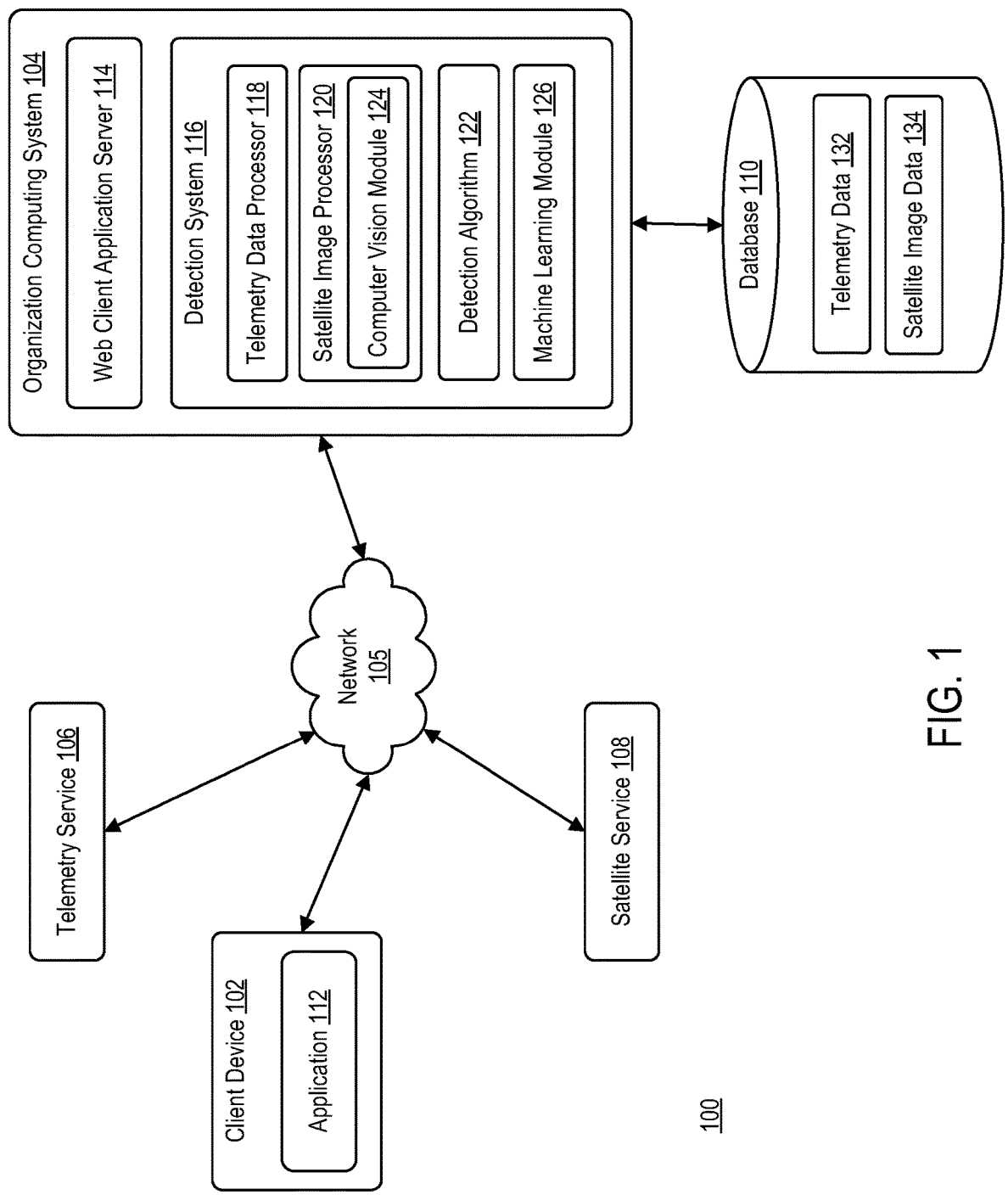
FIG. 1 is a block diagram illustrating an exemplary computing environment, according example embodiments.

In the energy field, operators typically need to file an application for permits to begin an energy project. Exemplary energy projects may include, but are not limited to, well pads, solar farms, wind farms, power plants, and the like. Once the permit gets approved, various information about the energy project may be released. This information may include, but it not limited to, location information, such as longitudinal and latitudinal coordinates.

Though regulations in the United States require publicly traded operators to reveal or publicly disclose the start date of each activity involved in the energy project, there is typically a delay in releasing this information. The delay period varies among states and operators. For example, the delay period could be anywhere between two months and six months, and can even extend to one year.

Using a specific example in the field of oil and gas. An operator will first construct a well pad to drill a well. After the well pad is built, the first stage—the "drilling stage"—commences. Conventionally, within several months after the permit approved date, the well will be spudded by a rig. This specific date is referred to as a "spud date." The date upon which drilling of a well is finished is referred to as the "rig release date" or "drilling end date." The rig release date or drilling end date is typically followed by a second stage known as the "completion stage." The completion stage includes operations such as hydraulic fracturing. The date upon which the completion is started may be referred to as the "completion start date". The end of the completion stage is referred to as the "completion end date." If a well is drilled but has not undergone well completion, it may be referred to as drilled but uncompleted wells or DUCs. After the completion end date, the well will be in the pre-producing stage and then start producing. There may be a delay in releasing the spud date, the rig release date, and/or the drilling end date.

To account for the reporting limitations, the one or more techniques described herein are directed to a detection system for energy project status information. Detection system may be configured to identify what stage a given energy project (e.g., well pad, solar farm, wind farm, power plant, etc.) is at based on at least two data sources: satellite images of the energy project and telemetry information near the energy project location. The telemetry data may include information directed to computing devices (e.g., cell phones, tablets, mobile devices, etc.) near the energy project location, such as, but not limited to, a number of computing devices detected near the energy project location, a device identifier (device ID) of each computing device, location coordinates of each computing device, and the like. By relying on objective information such as satellite images of the energy project and telemetry information near the energy project location, detection system is able to reduce the delay period and provide energy project status information to the public earlier than conventional systems.

FIG. 1 is a block diagram illustrating a computing environment 100, according to example embodiments. Computing environment 100 may include client device 102, organization computing system 104, telemetry service 106, and satellite service 108 communicating via one or more networks 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Client device 102 may be operated by a user. For example, client device 102 may be a mobile device, a tablet, a desktop computer, or any computing system having one or more of the capabilities described herein. Client device 102 may include at least one application 112. Application 112 may be representative of a web browser that allows access to a website or a stand-alone application. Client device 102 may access application 112 to access functionality of organization computing system 104. Client device 102 may communicate over network 105 to request a webpage or other information, for example, from web client application server 114 of organization computing system 104. For example, client device 102 may be configured to execute application 112 to access one or more functionalities of organization computing system 104. The content that is displayed to client device 102 may be transmitted from web client application server 114 to client device 102, and subsequently processed by application 112 for display through a display associated with client device 102.

Organization computing system 104 may be representative of one or more computer systems associated with an organization. Organization computing system 104 may include web client application server 114 and detection system 116. Detection system 116 may be formed from one or more software modules. The one or more software modules may be collections of instructions stored on a media (e.g., memory associated with organization computing system 104) that represents a series of machine instructions (e.g., program code) that implements one or more algorithmic steps. Such machine instructions may be the actual computer code a processor associated with organization computing system 104 interprets to implement the instructions, or, alternatively, may be a higher-level coding of the instructions that are interpreted to obtain the actual computer code. The one or more software modules may also include one or more hardware components. One or more aspects of the algorithm may be performed by the hardware components (e.g., circuitry) itself, rather as a result of an instruction.

Detection system 116 may be configured to identify what stage an energy project is at based on satellite images of the energy project and telemetry data about the energy project location. For example, detection system 116 may be configured to receive satellite images of an area containing the energy project from satellite service 108. Detection system 116 may further be configured to receive telemetry information associated with devices detected near or in proximity to the energy project from telemetry service 106.

Detection system 116 may include telemetry data processor 118, satellite image processor 120, and detection algorithm 122. Satellite image processor 120 may be configured to receive satellite image data of an energy project from satellite service 108 and process the satellite image data. For example, satellite image processor 120 may request satellite image data based on the energy project's location information (e.g., latitudinal and longitudinal coordinates). In some embodiments, satellite image processor 120 may request satellite image data for an area that contains the location information (e.g., latitudinal and longitudinal coordinates). In some embodiments, the area may be an Xm×Xm (e.g., 500 m×500 m) area surrounding the energy project's location. Based on this information, satellite image processor 120 may query satellite service 108 for satellite image data for one or more spectrum bands. For example, satellite image processor 120 may query satellite service 108 for one or more bands $b_{01}$-$b_{12}$. Given the satellite image data across the one or more spectral bands, satellite image processor 120 may convert the satellite image data into a satellite activity index (block 216). Detection system 116 may use the satellite activity index to identify each stage of the energy project. Satellite image processor 120 may include computer vision module 124. Computer vision module 124 may implement one or more computer vision algorithms to generate the satellite activity index for each image.

Telemetry data processor 118 may be configured to receive telemetry data for a location surrounding the energy project from telemetry service 106 and process the telemetry data. For example, telemetry data processor 118 may request telemetry data from telemetry service 106 based on the energy project's location information. The telemetry data may provide detection system 116 with an indication of a number of people one or near the energy project at various stages of the energy project. Given the telemetry data, telemetry data processor 118 may convert the telemetry data into a telemetry activity index. Detection system 116 may use the telemetry activity index in conjunction with the satellite activity index to identify a stage of the energy project.

Detection algorithm 122 may be representative of an algorithm configured to convert the satellite activity index and the telemetry activity index into a time series representation of both indices. Based on the time series representation of the satellite activity index, detection algorithm 122 may utilize one or more techniques to determine a stage of the energy project process.

In some embodiments, detection system 116 may further include machine learning module 126. Machine learning module 126 may be configured to identify new energy projects (e.g., well pads, facture ponds, solar farms, wind farms, power plants, etc.) in target areas, without any prior knowledge about the permit information. In other words, machine learning module 126 is specifically trained to identify a new energy project in a target location, regardless of whether permit information is published or known. Such use of machine learning module 126 is beneficial because there may be a delay in releasing the permit information for an energy project. Machine learning module 126 may include a convolutional neural network. Convolutional neural network may be trained using a plurality of images. For example, a training set may include millions of images of a set dimension (e.g., 500 m×500 m). In some embodiments, the energy project may be roughly located in the center of the images. Information such as pad area, facture ponds, wind turbines, solar panels, and the like may be identified in each image through detection algorithm 122. Machine learning module 126 may store the identified location information (e.g., coordinates) of the detected energy project. As a next step, machine learning module 126 may reconstruct or redownload patches of images targeting a larger area (e.g., 10 km×10 km) and may incorporate the coordinates of the energy project and/or components thereof in the larger area. Using images of the larger area and labeled energy project information, convolutional neural network may be trained to identify an energy project and/or components of the energy project from image data even before the energy project location information is released from the permits. Once convolutional neural network is trained, machine learning module 126 may receive, as input, images of a target region for analysis. Once a new energy project is detected by convolutional neural network, the location information of the energy project may be used by telemetry data processor 118 and satellite image processor 120 for further analysis.

In some embodiments, organization computing system may be in communication with database 110. Database 110 may be configured to store various information associated with detection system 116 and identified energy projects. In some embodiments, database 110 may be configured to store telemetry data 132 retrieved by telemetry data processor 118 and satellite image data 134 retrieved by satellite image processor 120. By storing the information retrieved from telemetry data processor 118, detection system 116 may use that information to identify previously identified mobile devices at a new energy project location.

Figure 2:
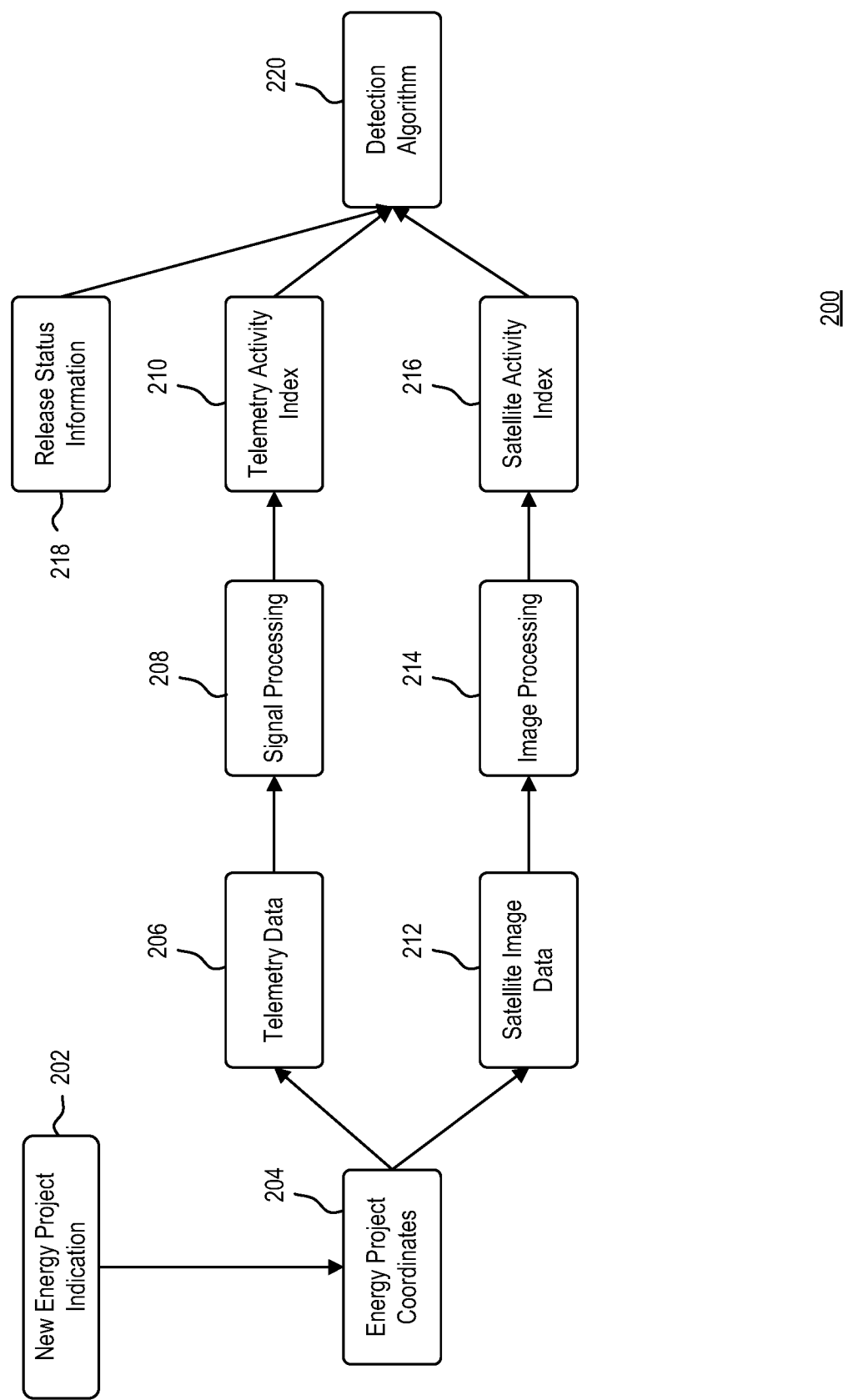
FIG. 2 is a block diagram illustrating an exemplary workflow implemented by detection system, according to example embodiments.

FIG. 2 is a block diagram illustrating an exemplary workflow 200 implemented by detection system 116, according to example embodiments. Workflow 200 may be initiated at block 202. At block 202, organization computing system 104 may receive an indication of a new energy project. In some embodiments, organization computing system 104 may receive the indication of a new energy project by monitoring one or more third party computing systems for updated permit information. In some embodiments, the permit information may include location details of the energy project. For example, the permit information may include at least the location information (e.g., latitudinal and longitudinal coordinates) of an energy project, the permit submitted date or permit approved date, the operator and geolocation information. The operator information and geolocation information such as basin/play tagging may be further utilized in the detection workflow to improve the detection accuracy.

At block 204, organization computing system 104 may provide energy project location information (e.g., coordinates) to detection system 116. Following receipt of energy project location information, detection system 116 may initiate two sub-processes. In some embodiments, detection system 116 may initiate the overall process with a satellite image analysis. For example, following block 204, workflow 200 may proceed to block 212. At block 212, detection system 116 may query satellite service 108 to obtain satellite image data of the energy project. In some embodiments, satellite image processor 120 may request satellite image data for an area that contains the location information. In some embodiments, the area may be an Xm×Xm (e.g., 500 m×500 m) area surrounding the energy project's location. Based on this information, satellite image processor 120 may query satellite service 108 for satellite image data for one or more spectrum bands. For example, satellite image processor 120 may query satellite service 108 for one or more bands $b_{01}$-$b_{12}$.

At block 214, satellite image processor 120 may process the satellite image data received from satellite service 108. For example, given satellite image data for one or more spectrum bands $b_{01}$-$b_{12}$, computer vision module 124 may process the satellite image data to identify various stages of the energy project. In some embodiments, computer vision module 124 may combine satellite image data for one or more spectrum bands $b_{01}$-$b_{12}$. For example, computer vision module 124 may utilize satellite image data from spectrum bands $b_{04}$, $b_{03}$, and $b_{02}$ for generating red-green-blue (RGB) true color image; computer vision module 124 may utilize satellite image data from spectrum bands $b_{01}$, $b_{02}$, $b_{04}$, $b_{08}$, $b_{09}$, $b_{09}$, $b_{10}$, $b_{11}$, $b_{12}$ for cloud detection; computer vision module 124 may utilize satellite image data for spectrum bands $b_{03}$, $b_{11}$ for snow detection; computer vision module 124 may utilize satellite image data for spectrum bands $b_{03}$, $b_{08}$ for water detection; and computer vision module 124 may utilize satellite image data for spectrum bands $b_{04}$, $b_{08}$ to determine whether the target area contains live vegetation.

In some embodiments, computer vision module 124 may not need to utilize separate spectrum bands for certain weather conditions. Instead, computer vision module 124 may analyze satellite images to detect energy project activity under all weather conditions.

In some embodiments, computer vision module 124 may implement one or more algorithms to process those satellite images with snow, cloud, or bad signal. For example, if computer vision module 124 determines that the snow index of an image shows greater that X % (e.g., >90%) of the image is covered by snow, and the middle area of the image is brighter than the outer area, and the vegetation index shows an outer area is live vegetation, computer vision module 124 may use an original image of the energy project. In some embodiments, if the snow index shows that greater than Y % (e.g., >60%) of the image is covered by snow, and the middle area of the image is darker than the outer area, computer vision module 124 may modify the image. In some embodiments, computer vision module 124 may modify the image by applying (255-original pixel value). In some embodiments, for all other images with cloud, snow, and or bad signal, computer vision module 124 may locate the pixels with cloud, snow or bad signal, gather the corresponding pixel values of the previous X (e.g., 3) clear images (e.g., n−5, n−10, n−15 days before), and replace the noisy pixels with the median value of the previous 3 pixel values to reduce or mitigate the impact of different illumination.

To detect the energy project area, computer vision module 124 may assume that the energy project is in the center of an image and that the energy project is brighter than the surrounding area. Accordingly, computer vision module 124 may covert RGB true color image to a greyscale image. Computer vision module 124 may calculate a threshold pixel value to further transform the image into binary values (e.g., bright vs. dark). Computer vision module 124 may filter out those points that may not be connected to the central area of the image. For example, computer vision module 124 may remove noise from the image by: (a) for each bright pixel, remove the pixel if there are less than N (e.g., 3) bright pixels in the surrounding M (e.g., 9) grid blocks; and (b) calculate the distance between each bright pixel to the image center and remove those points that exceed a threshold (e.g., mean+1.5·Std). Computer vision module 124 may draw a contour around the identified bright area of the image. Computer vision module 124 may draw a minimum bounding box about the contour. Computer vision module 124 may repeat these procedures for all images and select the box with the greatest area (e.g., max area) among the first X (e.g., 5) detected energy project images, and use that as the energy project area. Computer vision module 124 may select this image because the energy project may be under construction and the area bounding the energy project may change during the initial stages.

Satellite image processor 120 may continue to process satellite image data received from satellite service 108. For example, at various stages of energy project (e.g., initiation or completion), the satellite view of the energy project may vary. Using a specific example, for a well pad energy project, the first set of satellite images may be processed to detect land clearing. Land clearing may be identified by satellite image processor due to the center area of the images becoming much brighter. This may correspond to a first activity start. Once an energy project is substantially developed (e.g., when one stage of a project is almost finished), satellite image processor 120 may continue to receive satellite image data and calculate satellite activity index. Continuing with the above example, when the first activity ends, satellite image processor 120 may continue to receive satellite image to detect next stage activity. This time, satellite image processor 120 may look for a change to the center area, in which the center area becomes much darker. This change may signal a start to the second activity. Based at least in part on changes to the satellite image data (e.g., a change in pixel brightness in the center area), satellite image processor 120 may utilize detection algorithms 122 at block 220 to detect various stages of the energy project process. For example, for oil and gas, a first stage may include land clearing and a second stage may include well drilling and completion activities. In another example, for solar farms, a first stage may include land clearing for a photovoltaic system and a second stage may include a photovoltaic system installation. In another example, for wind farms, a first stage may include land clearing for wind turbines and a second stage may include wind turbine installation. In another example, for power plants, a first stage may include land clearing for the power plant and a second stage may include power plant construction.

Once satellite image processor 120 determines that a first stage of the energy project is complete (i.e., the land has been cleared) using computer vision module 124, detection system 116 may continue monitoring satellite image data of the energy project and may also start monitoring telemetry data to identify various activities in the second stage of the energy project. For example, workflow 200 may proceed to block 206. At block 206, telemetry data processor 118 may query telemetry service 106 for telemetry data based on the energy project's location information. Given the telemetry data, at block 208 telemetry data processor 118 may process this telemetry data. For example, telemetry data processor 118 may convert the telemetry data into a telemetry activity index.

Generally, due to the nature of raw telemetry data, there may be a lot of randomness and noise in the data. Accordingly, telemetry data processor 118 may process the raw number of devices and device IDs detected in an area bounding the energy project (e.g., a well pad neighborhood) to obtain a telemetry activity index (block 210). Processing the raw number of devices and device IDs to obtain the telemetry activity index may include time series analysis, online contouring, and classification algorithms. To get telemetry activity index, block 210 may need the dictionary built from block 208 and use classification algorithms to compute the index for different construction stages. Based on the dictionary, the classification algorithm may consume information, such as the count of devices that appeared in prior activity periods (e.g., past drilling periods, past completion periods, past photovoltaic system installation, past wind turbine installation, past power plant construction, etc.), as well as count of new devices and count of total devices. By using these statistics, a classifier may be trained to generate an index for each activity at inference time.

At block 220, telemetry data processor 118 may utilize one or more detection algorithms to determine a current activity of the energy project. For example, normally, there would be noticeable increase on telemetry data activity level when a well is spudded. Accordingly, one or more detection algorithms may check the consecutiveness and the magnitude of the telemetry data. In some embodiments, such as when the energy project is an oil and gas project, wells in a well pad may be categorized into several groups. Each group of wells may have its own threshold for consecutiveness and magnitude of the telemetry data.

In some embodiments, telemetry data processor 118 may also use the telemetry indices from block 210 to detect different construction, installation, drilling, and/or completion stages. For example, if the index value for drilling activity is frequent and strong enough to meet pre-defined threshold, a spud date is detected. The threshold may be a probability score that is determined by leveraging true positives and false positives from historical data. Telemetry data processor 118 may continue to monitor telemetry data to determine various stages of the energy project based on changes in the telemetry data activity level in a sequential manner. For example, in the beginning the telemetry index may be used to detect drilling activity, when spud date is detected or confirmed, telemetry index could be further utilized to detect fracking activity.

At block 220, detection system 116 may utilize one or more detection algorithms 122 to determine the stage of the energy project. For example, either the telemetry activity index may trigger the threshold for a specific energy project status or the satellite activity index may trigger the threshold correspondingly may allow the detection algorithm in block 220 to identify the current status of the energy project.

In some embodiments, block 220 may involve receiving input from one of more third party computing systems. For example, at block 218, organization computing system 104 may include energy project status information from one or more third party computing systems. The energy project status information may be used by detection algorithm 122 to validate a stage of the energy project.

Figure 3:
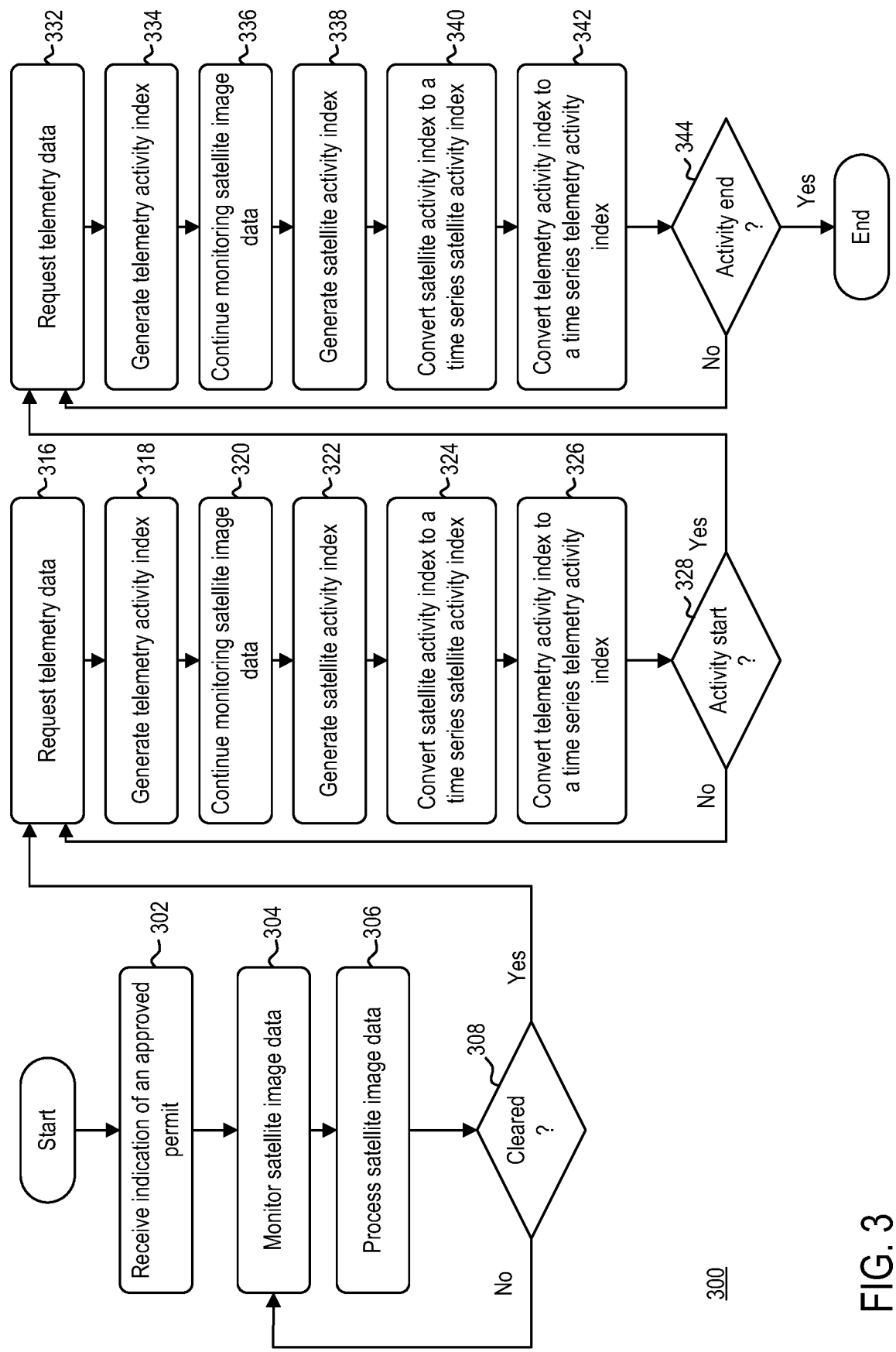
FIG. 3 is a flow chart illustrating a method of monitoring an energy project, according to example embodiments.

FIG. 3 is a flow diagram illustrating a method 300 of monitoring an energy project, according to example embodiments. Method 300 may begin at step 302.

At step 302, organization computing system 104 may receive an indication of an approved energy project permit. In some embodiments, organization computing system 104 may receive the indication of a new energy project by monitoring one or more third party computing systems for updated energy project permit information. In some embodiments, the permit information may include location details of the energy project. For example, the permit information may include at least the latitudinal and longitudinal coordinates of an area bounding the energy project.

At step 304, organization computing system 104 may monitor satellite image data of the energy project. For example, following receipt of an approved permit, organization computing system 104 may provide detection system 116 with the coordinates of the energy project. Detection system 116 may query satellite service 108 to obtain satellite image data of the energy project. In some embodiments, satellite image processor 120 may request satellite image data for an area that contains the location of the energy project. For example, the area may be an Xm×Xm (e.g., 500 m×500 m) area surrounding the energy project's latitudinal and longitudinal coordinates. Based on this information, satellite image processor 120 may query satellite service 108 for satellite image data for one or more spectrum bands. For example, satellite image processor 120 may query satellite service 108 for one or more bands $b_{01}$-$b_{12}$.

At step 306, organization computing system 104 may process the satellite image data. satellite image processor 120 may process the satellite image data received from satellite service 108. For example, example, given satellite image data for one or more spectrum bands $b_{01}$-$b_{12}$, computer vision module 124 may process the satellite image data to identify various stages of the energy project. In some embodiments, computer vision module 124 may combine satellite image data for one or more spectrum bands $b_{01}$-$b_{12}$. For example, computer vision module 124 may utilize satellite image data from spectrum bands $b_{04}$, $b_{03}$, and $b_{02}$ for generating red-green-blue (RGB) true color image; computer vision module 124 may utilize satellite image data from spectrum bands $b_{01}$, $b_{02}$, $b_{04}$, $b_{08}$, $b_{08A}$, $b_{09}$, $b_{10}$, $b_{11}$, $b_{12}$ for cloud detection; computer vision module 124 may utilize satellite image data for spectrum bands $b_{03}$, $b_{11}$ for snow detection; computer vision module 124 may utilize satellite image data for spectrum bands $b_{03}$, $b_{08}$ for water detection; and computer vision module 124 may utilize satellite image data for spectrum bands $b_{04}$, $b_{08}$ to determine whether the target area contains live vegetation.

In some embodiments, computer vision module 124 may implement one or more algorithms to process those satellite images with snow, cloud, or bad signal. For example, if computer vision module 124 determines that the snow index of an image shows greater that X % (e.g., >90%) of the image is covered by snow, and the middle area of the image is brighter than the outer area, and the vegetation index shows an outer area is live vegetation, computer vision module 124 may use an original image of the energy project. In some embodiments, if the snow index shows that greater than Y % (e.g., >60%) of the image is covered by snow, and the middle area of the image is darker than the outer area, computer vision module 124 may modify the image. In some embodiments, computer vision module 124 may modify the image by applying (255-original pixel value). In some embodiments, for all other images with cloud, snow, and or bad signal, computer vision module 124 may locate the pixels with cloud, snow or bad signal, gather the corresponding pixel values of the previous X (e.g., 3) clear images (e.g., n−5, n−10, n−15 days before), and replace the noisy pixels with the median value of the previous 3 pixel values to reduce or mitigate the impact of different illumination.

To detect the energy project, computer vision module 124 may assume that the energy project is in the center of an image and that the energy project is brighter than the surrounding area. Accordingly, computer vision module 124 may covert RGB true color image to a greyscale image. Computer vision module 124 may calculate a threshold pixel value to further transform the image into binary values (e.g., bright vs. dark). Computer vision module 124 may filter out those points that may not be connected to the central area of the image. For example, computer vision module 124 may remove noise from the image by: (a) for each bright pixel, remove the pixel if there are less than N (e.g., 3) bright pixels in the surrounding M (e.g., 9) grid blocks; and (b) calculate the distance between each bright pixel to the image center and remove those points that exceed a threshold (e.g., mean+1.5·Std). Computer vision module 124 may draw a contour around the identified bright area of the image. Computer vision module 124 may draw a minimum bounding box about the contour. Computer vision module 124 may repeat these procedures for all images and select the box with the greatest area (e.g., max area) among the first X (e.g., 5) detected energy project images, and use that as the energy project area. Computer vision module 124 may select this image because the energy project may be under construction and the area bounding the energy project may change during the initial stages.

At step 308, organization computing system 104 may determine whether the land has been cleared. For example, satellite image processor 120 may determine whether the land has been cleared (e.g., a well pad has been constructed) based on the processing performed by computer vision module 124. If, for example, at step 308, satellite image processor 120 determines that the land has not been cleared, method 300 reverts to step 304 and satellite image processor 120 continues to monitor and process satellite image data. If, however, at step 308, satellite image processor 120 determines that the land has been cleared, method 300 proceeds to step 316.

At step 316, organization computing system 104 may request telemetry data from telemetry service 106. For example, once satellite image processor 120 determines that the land has been cleared, detection system 116 may activate telemetry data processor 118 to detect the start of activity for the energy project. For example, telemetry data processor 118 may be activated to detect the spud date, the start of photovoltaic system installation, the start of wind turbine installation, the start of power plant construction, and the like. In some embodiments, telemetry data processor 118 may query telemetry service 106 for telemetry data based on the energy project's location information.

At step 318, organization computing system 104 may generate a telemetry activity index based on the telemetry data. For example, telemetry data processor 118 may process the raw number of devices and/or device IDs detected in an area bounding the energy project to obtain a telemetry activity index. Processing the raw number of devices and/or device IDs to obtain the telemetry activity index may include time series analysis, online contouring and classification algorithms.

At step 320, organization computing system 104 may continue monitoring satellite image data. Crews are typically expected to enter the area bounding the energy project when construction, installation, or drilling is about to start. For example, a drilling crew with facilities such as rigs and truck may typically be spotted as black on a satellite image. Thus, an increase in the black area of a satellite image is typically expected once activity begins for the energy project.

At step 322, organization computing system 104 may generate satellite activity index based on the continued monitoring of the satellite image data. To determine the start of activity for the energy project, computer vision module 124 may implement one or more algorithms to be applied to the satellite image data. For example, computer vision module 124 may fix the target energy project area identified in the image. Computer vision module 124 may normalize each image to identify a fixed mean and standard deviation. Normalizing each image may help to remove the effect of different illuminations. Computer vision module 124 may calculate the dark area ratio for each image. Satellite image processor 120 may use the dark area ratio as the satellite activity index. The dark area ratio may signal to satellite image processor 120 whether there is activity occurring for the energy project.

At step 324, organization computing system 104 may convert the satellite activity index to a time series of satellite activity index. For example, satellite image processor 120 may convert the satellite activity index into a time series for activity for the energy project (e.g., detecting drilling and completion activity). In some embodiments, the time series of the satellite activity index may be transformed into a time series containing only three values, −1, 0, 1, where −1 may represent a decreasing trend, 1 may represent an increasing trend, and 0 may represent no change in trend. In some embodiments, satellite image processor 120 may convert the time series by: (1) at point X, calculate n points ([X−n:X−1]) moving average of the satellite activity index as $X_{moving\_average}$ (hereinafter $X_{ma}$) and a set of thresholds; if satellite activity index of X is larger than $X_{ma}$+threshold, then satellite image processor 120 may convert the corresponding activity index to 1; if satellite activity index of X is smaller than $X_{ma}$−threshold, then satellite image processor 120 may convert the corresponding activity index to −1; else, satellite image processor 120 may convert the corresponding activity index to 0.

At step 326, organization computing system 104 may convert telemetry activity index to a time series telemetry activity index. For example, telemetry data processor 118 may utilize one or more algorithms to transform the raw telemetry data to a time series for the telemetry activity index. The time series is generated by concatenating the index values from all past days. By converting to a time series, telemetry data processor 118 converts the telemetry data to a format more easily processable by detection algorithm 122. Generally, an increase in total device count or count of devices that appeared in periods typically occurs when an initiation of activity for the energy project starts. For example, a spike in the time series may indicate the start of a drilling stage, the start of a photovoltaic system installation, a start of wind turbine installation, a start of facility construction, and the like.

At step 328, organization computing system 104 may determine if activity has begun for determining an activity start date. For example, to determine whether drilling activity has begun, detection system 116 may rely on at least one of the time series of the satellite activity data and the time series for the telemetry activity data. In some embodiments, detection system 116 may apply detection algorithm 122 to the time series for the telemetry activity data to check the consecutiveness and the magnitude of the device count, and also count of device IDs that appeared in past activity periods by using information from block 218. The start date may be detected when the telemetry index value is frequent and strong enough to meet a pre-defined threshold. In another example, detection system 116 may apply the detection algorithm 122 to the time series for the satellite activity data to identify peaks and valleys in the time series. In some embodiments, the first peak may correspond to the start of activity (e.g., the spud date). In some embodiments, detection system 116 may utilize either the telemetry data (i.e., time series for the telemetry activity data) or the satellite image data (i.e., time series for the satellite activity data). In some embodiments, detection system 116 may utilize both the telemetry data and the satellite image data.

If, for example, at step 328, detection system 116 determines that activity has not started, method 300 may refer to step 316, and detection system 116 may continue to analyze satellite image data and telemetry data. If, however, at step 328, detection system 116 determines that the activity has started, method 300 may proceed to step 332.

At step 332, organization computing system 104 may continue to request telemetry data from telemetry service 106. In some embodiments, telemetry data processor 118 may query telemetry service 106 for telemetry data based on the energy project's location information.

At step 334, organization computing system 104 may generate a telemetry activity index based on the telemetry data. For example, telemetry data processor 118 may process the raw number of devices and/or device IDs detected on the area bounding the energy project to obtain a telemetry activity index. Processing the raw number of devices and/or device IDs to obtain the telemetry activity index may include time series analysis, online contouring and classification algorithms.

At step 336, organization computing system 104 may continue monitoring satellite image data. Crews are generally expected to leave the area when the drilling, construction, installation, and the like comes to an end. Thus, a decrease in the black area of a gray scaled true color satellite image or a decrease in the brighter area of a radar image is typically expected for signaling the end of activity.

At step 338, organization computing system 104 may generate satellite activity index based on the continued monitoring of the satellite image data. To determine the activity end date, computer vision module 124 may implement one or more algorithms to be applied to the satellite image data. For example, computer vision module 124 may fix the energy project area identified in the image. Computer vision module 124 may normalize each image to identify a fixed mean and standard deviation. Normalizing each image may help to remove the effect of different illuminations. Computer vision module 124 may calculate the dark area ratio for each image. Satellite image processor 120 may use the dark area ratio as the satellite activity index.

At step 340, organization computing system 104 may convert the satellite activity index to a time series of satellite activity index. For example, satellite image processor 120 may convert the satellite activity index into a time series for detecting the end of the activity. In some embodiments, the time series of the satellite activity index may be transformed into a time series containing only three values, −1, 0, 1, where −1 may represent a decreasing trend, 1 may represent an increasing trend, and 0 may represent no change in trend. In some embodiments, satellite image processor 120 may convert the time series by: (1) at point X, calculate n points ([X−n:X−1]) moving average of the satellite activity index as $X_{moving\_average}$ (hereinafter $X_{ma}$) and a set of thresholds; if satellite activity index of X is larger than $X_{ma}$+threshold, then satellite image processor 120 may convert the corresponding activity index to 1; if satellite activity index of X is smaller than $X_{ma}$−threshold, then satellite image processor 120 may convert the corresponding activity index to −1; else, satellite image processor 120 may convert the corresponding activity index to 0.

At step 342, organization computing system 104 may convert telemetry activity index to a time series telemetry activity index. For example, telemetry data processor 118 may utilize one or more algorithms to transform the raw telemetry data to a time series for the telemetry activity index. The time series is generated by concatenating the index values from all past days. By converting to a time series, telemetry data processor 118 converts the telemetry data to a format more easily processable by detection algorithm 122. Generally, a decrease in total device count or count of devices that appeared in past periods typically occurs when the activity ends or comes to an end. Accordingly, a valley in the time series may indicate the end of the activity (e.g., end of drilling, construction, installation, etc.).

At step 344, organization computing system 104 may determine if activity has ended. For example, to determine whether the activity has ended, detection system 116 may rely on at least one of the time series of the satellite activity data and the time series for the telemetry activity data. For example, detection system 116 may apply detection algorithm 122 to the time series for the telemetry activity data to check if there is a decrease trend in the consecutiveness and the magnitude of device count, and also count of device IDs that appeared in past periods by using information from block 218. The activity end date may be detected when the decrease is strong enough such that the index value meets a pre-defined lower threshold (e.g., local minimum). In another example, detection system 116 may apply the detection algorithm 122 to the time series for the satellite activity data to identify peaks and valleys in the time series. In some embodiments, the first trough or valley may correspond to the end of drilling. In some embodiments, detection system 116 may utilize either the telemetry data (i.e., time series for the telemetry activity data) or the satellite image data (i.e., time series for the satellite activity data). In some embodiments, detection system 116 may utilize both the telemetry data and the satellite image data.

In some embodiments, detection system 116 may improve the accuracy of detection algorithm 122 by referencing public information for energy projects that may be similar to the target energy project. For example, detection system 116 may identify energy projects that may be within the same subplay/basin and with the same number of wells as the target energy project and use that information to calculate the days between the spud date and the drilling end date. In some embodiments, detection system 116 may calculate the minimum possible number of days and the maximum possible number of days from start date to end date.

If, for example, at step 344, detection system 116 determines that activity has not stopped, method 300 may revert to step 316, and detection system 116 may continue to analyze satellite image data and telemetry data. If, however, at step 344, detection system 116 determines that the activity has stopped, method 300 may end.

As those skilled in the art understand, the processes discussed in FIG. 3 may be repeated if there are multiple activities for an energy project. For example, with respect to oil and gas, the steps 316-344 may be initiated for detecting the start of drilling and the end of drilling; steps 316-344 may be repeated to detect the start of well completion and the end of well completion. For example, fracking crews are typically expected to enter a well pad when the completion stage of the well starts. Fracking crew with facilities such as frac fleets and truck may typically be spotted as black on a gray scaled true color satellite image or as bright pixels on a radar image. Thus, an increase in the black area of a gray scaled true color satellite image or an increase in the bright area of a radar image is typically expected for the completion stage of the well. Similarly, fracking crews are typically expected to leave the well pad when the completion stage of the well ends. Thus, a decrease in the black area of a gray scaled true color satellite image or a decrease in the bright area of a radar image is typically expected for the completion stage of the well. Accordingly, such operations may be applied to the completion activity as well.

Figure 4:
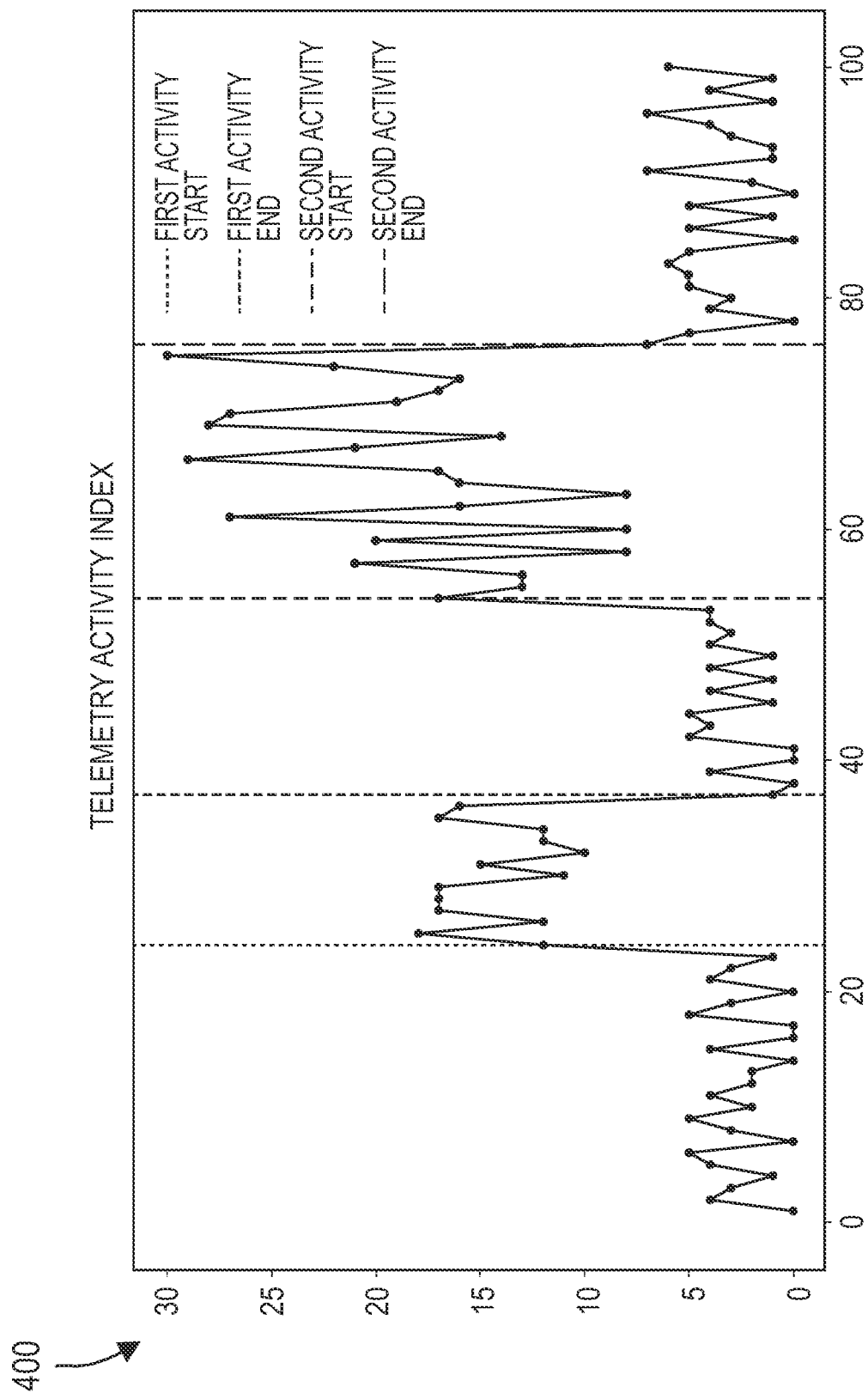
FIG. 4 illustrates a chart illustrating telemetry activity index generated by telemetry data processor, according to example embodiments.

FIG. 4 illustrates a chart 400 illustrating telemetry activity index generated by telemetry data processor 118, according to example embodiments. As illustrated in chart 400, local maximums and local minimums may correspond to various stages of the energy project construction.

Figure 5:
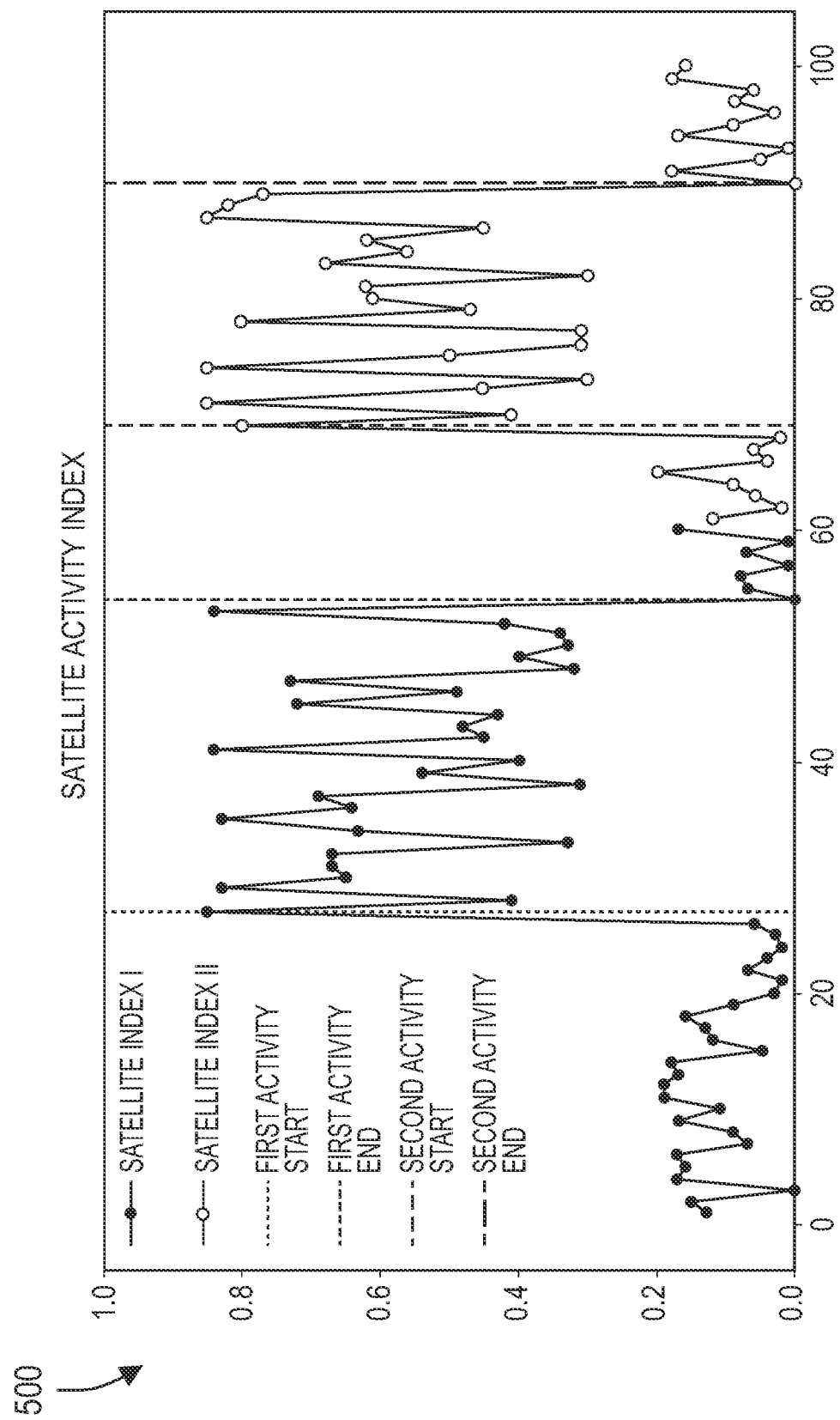
FIG. 5 illustrates a chart illustrating satellite activity index generated by satellite image processor, according to example embodiments.

FIG. 5 illustrates a chart illustrating satellite activity index generated by satellite image processor 120, according to example embodiments. As illustrated in chart 500, each peak and each valley may correspond to various stages of the energy project construction.

Figure 6:
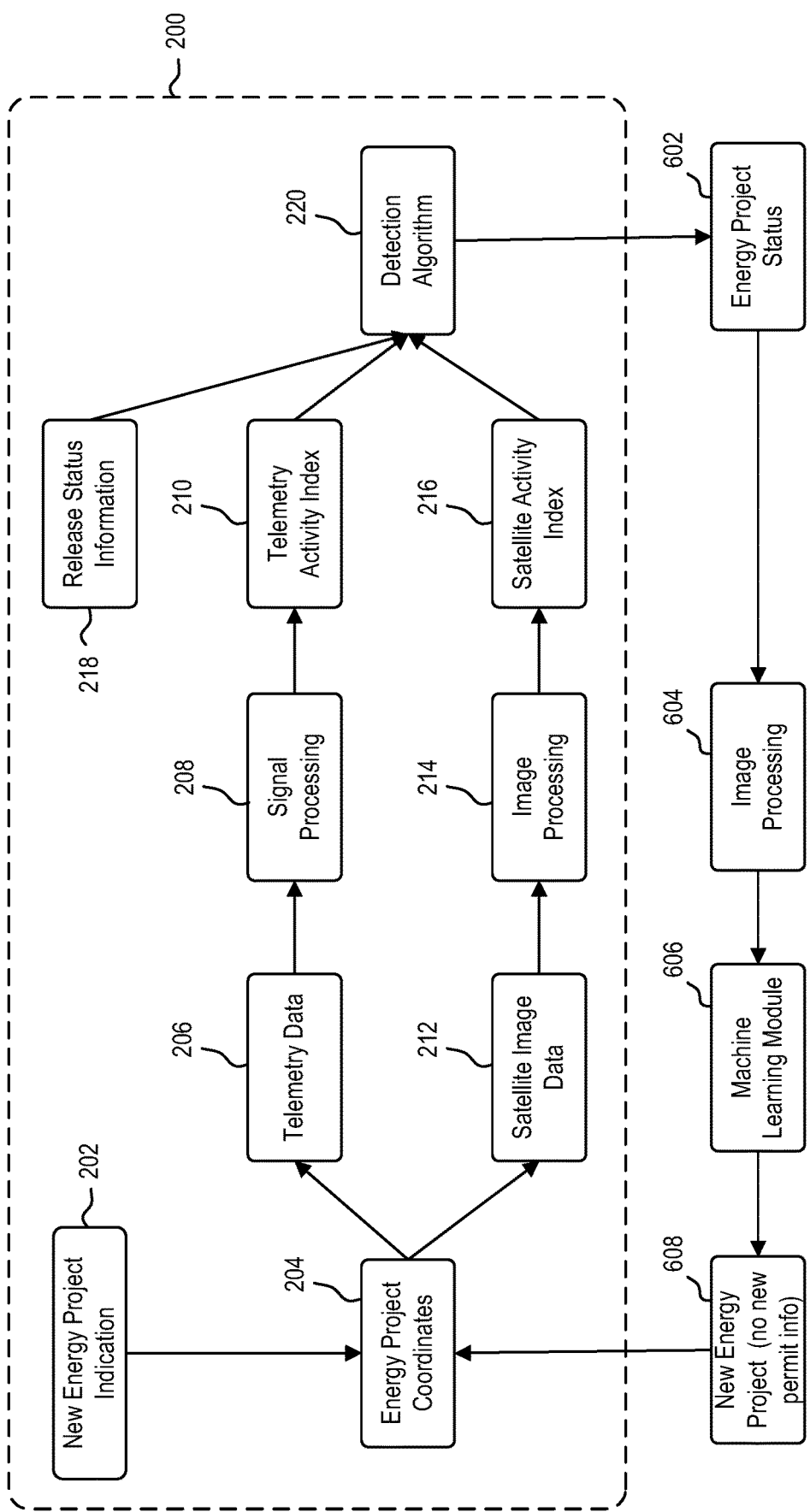
FIG. 6 is a block diagram illustrating an exemplary workflow implemented by detection system, according to example embodiments.

FIG. 6 is a block diagram illustrating an exemplary workflow 600 implemented by detection system 116, according to example embodiments. As illustrated, workflow 600 may include workflow 200 described above in conjunction with FIG. 2. Workflow 600 may include additional operations reflected in blocks 602-608.

As provided above, detection system 116 may further include machine learning module 126. Machine learning module 126 may be configured to identify new energy projects in target areas, without any prior knowledge about the permit information. In other words, machine learning module 126 is specifically trained to identify a new energy project in a target location, regardless of whether permit information is published or known. Blocks 602-608 may reflect this process.

At block 602, detection system 116 may identify images for which the energy project status is known. For example, to train convolutional neural network, detection system 116 may generate a training set. In some embodiments, the training set may include millions of images. In some embodiments, each image may have a dimension of about 500 m×500 m. In some embodiments, each image may include labeled information, such as, but not limited to, energy project area and energy project activity status. In some embodiments, detection system 116 may store the location information of the detected energy project area boundaries.

At block 604, detection system 116 may process the images identified at block 602. For example, detection system 116 may be configured to reconstruct or redownload images targeting a larger area (e.g., 10 km×10 km). In some embodiments, the larger area (i.e., 10 km×10 km) may include at least one of the smaller area images (i.e., 500 m×500 m). For example, detection system 116 may incorporate the location information of an energy project from block 602 in the larger area identified at block 604.

At block 606, detection system 116 may train machine learning module 126. For example, detection system 116 may train convolutional neural network based on the processed images from block 604. For example, for most sites (e.g., oil/gas well pads, solar farm, wind farm, power plant, etc.), there may be centered latitude and longitude coordinates from upstream sources. Satellite image processor 120 and detection algorithm 122 pre-process a plurality of images fetched or received from satellite service 108 by detecting bounding boxes for these sites. To cover the remaining portion of sites that may not have centered latitude and longitude coordinates due to being located close to buildings or farmlands, a semi-supervised method may be used to train machine learning module 126. For example, training may begin by processing those satellite images of sites that have centered latitude and longitude coordinates and are not close to buildings or farmlands using computer vision module 124 to detect their bounding boxes. Organization computing system 104 may then choose random satellite images, which do not contain areas of interest. These images (i.e., the centered images and the random images) may be used as training examples for the convolutional neural network. Once trained, the convolutional neural network may be deployed to analyze new incoming satellite images. In some embodiments, the processed images are grouped into three parts: (1) images that have high probability scores may be considered as active areas; images that have low probability scores may be considered as inactive areas; and (3) images that have medium probability scores may be passed to human annotators to decide whether they represent active areas or inactive areas. For those images in group three, the human annotated images may be used to further train machine learning module 126 as positive or negative training example to improve the convolutional neural network.

At block 608, detection system 116 may be able to identify new energy project information without having to rely on permit information being available. For example, once convolutional neural network is trained, detection system 116 may divide satellite image data of a target region into multiple smaller areas (e.g., 10 km×10 km) areas and input those images to machine learning module 126. Machine learning module 126 may determine if a new energy project has been initiated (e.g., an area has been cleared) using fully trained convolutional neural network.

Figure 7:
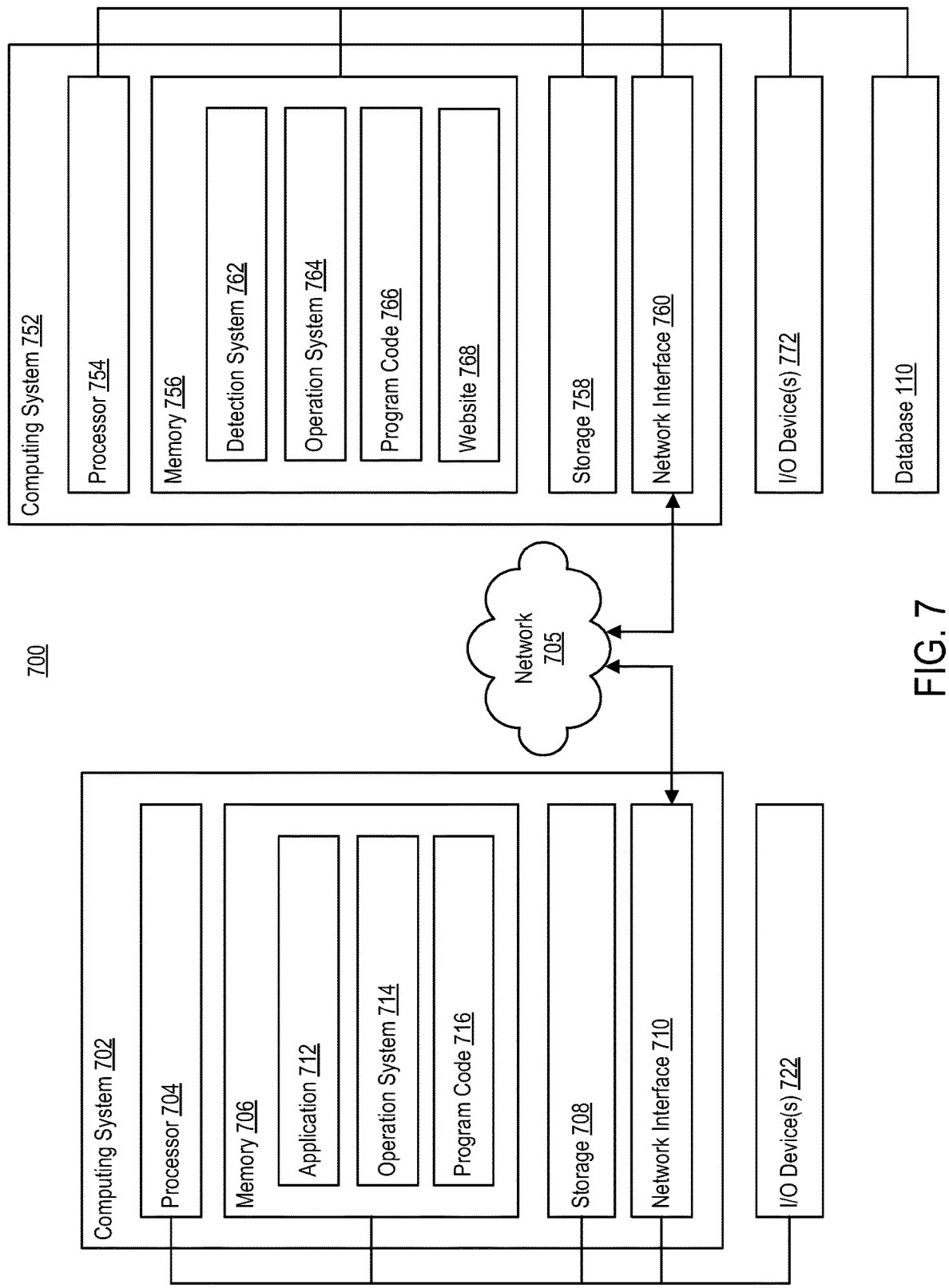
FIG. 7 is block diagram illustrating a computing environment, according to example embodiments.

FIG. 7 is a block diagram illustrating a computing environment 700, according to example embodiments. Computing environment 700 includes computing system 702 and computing system 752 communicating over network 705. Computing system 702 may be representative of client device 102. Computing system 752 may be representative of organization computing system 104.

Computing system 702 may include processor 704, memory 706, storage 708, and network interface 710. In some embodiments, computing system 702 may be coupled to one or more I/O devices 722 (e.g., keyboard, mouse, monitor, etc.).

Processor 704 retrieves one executes program code 716 (i.e., programming instructions) stored in memory 706, as well as stores and retrieves application data. Processor 704 may be representative of a single processor, multiple processors, a single processor having multiple processing cores, and the like. Network interface 710 may be any type of network communications enabling computing system 702 to communicate externally via network 705. For example, network interface 710 may allow computing system 702 to communicate with computing system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include application 712, operating system 714, and program code 716. Program code 716 may be accessed by processor 704 for processing (i.e., executing program instructions). Program code 716 may be accessed by processor 704 for processing (i.e., executing program instructions). Program code 716 may include, for example, executable instructions for communicating with computing system 752 to display one or more pages of website 768. Application 712 may enable a user of computing system 702 to access a functionality of computing system 752. For example, application 712 may access content managed by computing system 752, such as website 768. The content that is displayed to a user of computing system 702 may be transmitted from computing system 752 to computing system 702, and subsequently processed by application 712 for display through a graphical user interface (GUI) of computing system 702.

Computing system 752 may include processor 754, memory 756, storage 758, and network interface 760. In some embodiments, computing system 752 may be coupled to one or more I/O devices 772 and database 110.

Processor 754 may retrieve and execute program code 766 (i.e., programming instructions) stored in memory 756, as well as store and retrieve application data. Processor 754 may be representative of a single processor, multiple processors, a single processor having multiple processing cores, and the like. Network interface 760 may be any type of network communications enabling computing system 752 to communicate externally via network 705. For example, network interface 760 may allow computing system 752 to communicate with computing system 702.

Storage 758 may be, for example, a disk storage device. Although shown as a single unit, storage 758 may be a combination of fixed and/or removable storage devices, such as fixed disk drives, removable memory cards, optical storage, network attached storage (NAS), storage area network (SAN), and the like.

Memory 756 may include detection system 762, operating system 764, program code 766, and website 768. Program code 766 may be accessed by processor 754 for processing (i.e., executing program instructions). Program code 766 may include, for example, executable instructions configured to perform steps discussed above in conjunction with FIGS. 2-6. As an example, processor 754 may access program code 766 to perform operations for identifying a stage of an energy project. In another example, processor 754 may access program code 766 to perform operations for training convolutional neural network to identify initiation of an energy project. Website 768 may be accessed by computing system 702. For example, website 768 may include content accessed by computing system 702 via a web browser or application.

Detection system 762 may be configured to identify what stage an energy project is at based on satellite images of the energy project and telemetry data about an area bounding the energy project. Detection system 762 may include telemetry data processor, satellite image processor, and detection algorithm. Satellite image processor may be configured to receive satellite image data of an energy project from satellite service and process the satellite image data. For example, satellite image processor may request satellite image data based on an energy project's latitudinal and longitudinal coordinates. In some embodiments, satellite image processor may request satellite image data for an area that contains the latitudinal and longitudinal coordinates. Detection system 762 may use the satellite activity index to identify the stage of the energy project. Satellite image processor may include computer vision module. Computer vision module may implement one or more computer vision algorithms to generate the satellite activity index for each image.

Telemetry data processor may be configured to receive telemetry data for a location bounding an energy project from telemetry service and process the telemetry data. For example, telemetry data processor may request telemetry data from telemetry service based on the energy project's latitudinal and longitudinal coordinates. Given the telemetry data, telemetry data processor may convert the telemetry data into a telemetry activity index. Detection system 762 may use the telemetry activity index in conjunction with the satellite activity index to identify a stage of the energy project.

Detection algorithm may be representative of an algorithm configured to convert the satellite activity index and the telemetry activity index into a time series representation of both indices. Based on the time series representation of the satellite activity index, detection algorithm may utilize one or more techniques to determine a stage of the energy project. Based on the time series representation of the telemetry activity index, detection algorithm may utilize one or more techniques to determine a stage of the energy project.

In some embodiments, detection system 762 may further include machine learning module. Machine learning module may be configured to identify new energy projects in target areas, without any prior knowledge about the permit information. Machine learning module may include a convolutional neural network. Convolutional neural network may be trained using a plurality of images. Information such as the energy project and bounding area may be identified in each image. Machine learning module may store the identified coordinates of the detected energy project. As a next step, machine learning module may reconstruct or redownload images targeting a larger area and may incorporate the coordinates of the detected energy project in the larger area. Using images of the larger area and labeled energy project information, convolutional neural network may be trained to identify an energy project area from image data. Once convolutional neural network is trained, machine learning module may receive, as input, images of a target region for analysis. Once a new energy project is detected by convolutional neural network, the coordinates the energy project may be used by telemetry data processor and satellite image processor for further analysis.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A computer-implemented method for monitoring an energy project, comprising:
  receiving, at a computing system, an indication of an energy project, wherein the indication comprises location data associated with the energy project; receiving, by the computing system, satellite image data of the energy project, wherein the satellite image data of the energy project corresponds to the location data associated with the energy project, the satellite image data comprising images across a plurality of spectrum bands, the plurality of spectrum bands comprising a first range of spectrum bands and a second range of spectrum bands distinct from the first range of spectrum bands, wherein the second range of spectrum bands comprises at least one non-visible spectrum band, wherein the first range of spectrum bands is dedicated to detecting a first type of feature and the second range of spectrum bands is dedicated to detecting a second type of feature, wherein the first type of feature is one of live vegetation, snow, water or clouds, the second type of feature is one of live vegetation, snow, water, or clouds, and the first type of feature is different from the second image type of feature;
  processing, by the computing system, the satellite image data to determine that a first activity has been initiated for the energy project based on a change in the satellite image data, the processing comprising:
    analyzing the plurality of spectrum bands of the satellite image data using a computer vision module of the computing system to determine that the first activity has been initiated based on a first indication of whether a first image feature of the first type was detected in the first range of spectrum bands and a second indication of whether a second image feature of the second type was detected in the second range of spectrum bands;
  upon determining that the first activity has been initiated, monitoring, by the computing system, telemetry data associated with a location corresponding to the energy project;
  continuing, by the computing system, to monitor the satellite image data of the energy project simultaneous with the telemetry data;
  converting, by the computing system, the telemetry data associated with the location corresponding to the energy project to a telemetry activity index;
  converting, by the computing system, the satellite image data associated with the energy project to a satellite activity index; and determining, by the computing system, that the first activity has ended for the energy project based on changes in at least one of the telemetry activity index and the satellite activity index.

2. The computer-implemented method of claim 1, wherein receiving, at the computing system, the indication of the energy project comprises:
  receiving the indication from a third party computing system of an approved permit.

3. The computer-implemented method of claim 1, wherein receiving, at the computing system, the indication of the energy project comprises:
  predicting, by a convolutional neural network, that energy project construction has begun based on a portion of the satellite image data of an area bounding the energy project.

4. The computer-implemented method of claim 1, wherein converting, by the computing system, the satellite image data associated with the energy project to the satellite activity index comprises:
  generating a time series representation of the satellite activity index.

5. The computer-implemented method of claim 4, wherein determining, by the computing system, that the second first activity has occurred ended comprises:
  applying a detection algorithm to the time series representation of the satellite activity index to identify peaks and valleys in the time series representation, wherein each peak and each valley corresponds to a respective activity associated with the energy project.

6. The computer-implemented method of claim 1, wherein converting, by the computing system, the telemetry data associated with the location corresponding to the energy project to the telemetry activity index comprises:
  generating a time series representation of the telemetry activity index.

7. The computer-implemented method of claim 6, wherein determining, by the computing system, that the first activity has ended comprises:
  applying a detection algorithm to the time series representation of the telemetry activity index to identify a consecutiveness and a magnitude of the telemetry data.

8. A system, comprising:
  a processor; and
  a memory having programming instruction stored thereon, which, when executed by the processor, causes the system to perform one or more operations comprising:
  receiving an indication of an energy project, wherein the indication comprises location data associated with the energy project;
  receiving satellite image data of the energy project, wherein the satellite image data of the energy project corresponds to the location data associated with the energy project, the satellite image data comprising images across a plurality of spectrum bands, the plurality of spectrum bands comprising a first range of spectrum bands and a second range of spectrum bands distinct from the first range of spectrum bands, wherein the second range of spectrum bands comprises at least one non-visible spectrum band, wherein the first range of spectrum bands is dedicated to detecting a first type of feature and the second range of spectrum bands is dedicated to detecting a second type of feature, wherein the first type of feature is one of live vegetation, snow, water or clouds, the second type of feature is one of live vegetation, snow, water, or clouds, and the first type of feature is different from the second image type of feature;
  processing the satellite image data to determine that a first activity has been initiated for the energy project based on a change in the satellite image data, the processing comprising:
    analyzing the plurality of spectrum bands of the satellite image data using a computer vision module of the system to determine that the first activity has been initiated based on a first indication of whether a first image feature of the first type was detected in the first range of spectrum bands and a second indication of whether a second image feature of the second type was detected in the second range of spectrum bands;

upon determining that the first activity has been initiated, monitoring telemetry data associated with a location corresponding to the energy project; continuing to monitor the satellite image data of the energy project simultaneous with the telemetry data; converting the telemetry data associated with the location corresponding to the energy project to a telemetry activity index;

converting the satellite image data associated with the energy project to a satellite activity index; and determining that the first activity has ended for the energy project based on changes in at least one of the telemetry activity index and the satellite activity index.

9. The system of claim 8, wherein receiving the indication of the energy project comprises:
   receiving the indication from a third party computing system of a well permit.

10. The system of claim 8, wherein receiving the indication of the energy project comprises:
    predicting, by a convolutional neural network, that energy project construction has begun based on satellite image data of a portion of an area bounding the energy project.

11. The system of claim 8, wherein converting the satellite image data associated with the energy project to the satellite activity index comprises:
    generating a time series representation of the satellite activity index.

12. The system of claim 11, wherein determining that the first activity has ended comprises:
    applying a detection algorithm to the time series representation of the satellite activity index to identify peaks and valleys in the time series representation, wherein each peak and each valley corresponds to a respective activity associated with the energy project.

13. The system of claim 8, wherein converting the telemetry data associated with the location corresponding to the energy project to the telemetry activity index comprises:
    generating a time series representation of the telemetry activity index.

14. The system of claim 13, wherein determining that the first activity has ended comprises:
    applying a detection algorithm to the time series representation of the telemetry activity index to identify a consecutiveness and a magnitude of the telemetry data.

15. A non-transitory computer readable medium including one or more instructions that, when executed by a computing system, causes the computing system to perform one or more operations comprising:
    receiving, at the computing system, an indication of an energy project, where in the indication comprises location data associated with the energy project; receiving, by the computing system, satellite image data of the energy project, wherein the satellite image data of the energy project corresponds to the location data associated with the energy project, the satellite image data comprising images across a plurality of spectrum bands, the plurality of spectrum bands comprising a first range of spectrum bands and a second range of spectrum bands distinct from the first range of spectrum bands, wherein the second range of spectrum bands comprises at least one non-visible spectrum band, wherein the first range of spectrum bands is dedicated to detecting a first type of feature and the second range of spectrum bands is dedicated to detecting a second type of feature, wherein the first type of feature is one of live vegetation, snow, water or clouds, the second type of feature is one of live vegetation, snow, water, or clouds, and the first type of feature is different from the second image type of feature;

processing, by the computing system, the satellite image data to determine that a first activity has been initiated for the energy project based on a change in the satellite image data, the processing comprising:
        analyzing the plurality of spectrum bands of the satellite image data using a computer vision module of the computing system to determine that the first activity has been initiated based on a first indication of whether a first image feature of the first type was detected in the first range of spectrum bands and a second indication of whether a second image feature of the second type was detected in the second range of spectrum bands;

upon determining that the first activity has occurred, monitoring, by the computing system, telemetry data associated with a location corresponding to the energy project;

continuing, by the computing system, to monitor the satellite image data of the energy project simultaneous with the telemetry data; converting, by the computing system, the telemetry data associated with the location corresponding to the energy project to a telemetry activity index;

converting, by the computing system, the satellite image data associated with the energy project to a satellite activity index; and determining, by the computing system, that the first activity has ended for the energy project based on changes in at least one of the telemetry activity index and the satellite activity index.

16. The non-transitory computer readable medium of claim 15, wherein receiving, at the computing system, the indication of the energy project comprises:
    receiving the indication from a third party computing system of an approved permit.

17. The non-transitory computer readable medium of claim 15, wherein receiving, at the computing system, the indication of the energy project comprises:
    predicting, by a convolutional neural network, that energy project construction has begun based on satellite image data of an area bounding the energy project.

18. The non-transitory computer readable medium of claim 15, wherein converting, by the computing system, the satellite image data associated with the energy project to the satellite activity index comprises:
    generating a time series representation of the satellite activity index.

19. The non-transitory computer readable medium of claim 18, wherein determining, by the computing system, that the first activity has ended comprises:
    applying a detection algorithm to the time series representation of the satellite activity index to identify peaks and valleys in the time series representation, wherein each peak and each valley corresponds to an activity associated with the energy project.

20. The non-transitory computer readable medium of claim 15, wherein converting, by the computing system, the telemetry data associated with the location corresponding to the energy project to the telemetry activity index comprises:
    generating a time series representation of the telemetry activity index.

* * * * *